United States Patent [19]

Takahashi et al.

[11] Patent Number: 5,450,533
[45] Date of Patent: Sep. 12, 1995

[54] METHOD AND APPARATUS FOR PRINTING CONTINUOUS PATTERN

[75] Inventors: Yasuhiko Takahashi; Akira Higashide; Hiroto Yamada, all of Tokyo, Japan

[73] Assignee: Nippon Steel Corporation, Tokyo, Japan

[21] Appl. No.: 22,597

[22] Filed: Feb. 17, 1993

Related U.S. Application Data

[63] Continuation of Ser. No. 890,793, Jun. 1, 1992.

[30] Foreign Application Priority Data

May 31, 1991 [JP] Japan ................................. 3-155533

[51] Int. Cl.⁶ .............................................. G06F 15/00
[52] U.S. Cl. ........................................ 395/117; 395/102
[58] Field of Search ............... 395/101, 102, 109, 117, 395/133, 134, 135, 141, 146, 147, 149; 358/450, 452; 400/65

[56] References Cited

U.S. PATENT DOCUMENTS

| | | | |
|---|---|---|---|
| 4,811,239 | 3/1989 | Tsao ..................... | 315/109 |
| 4,818,622 | 4/1990 | Granger et al. ........ | 315/109 |
| 5,028,993 | 7/1991 | Kobur et al. ........... | 358/76 |
| 5,029,114 | 7/1991 | Makigkuchi ........... | 395/117 |

FOREIGN PATENT DOCUMENTS

| | | | |
|---|---|---|---|
| 391771 | 4/1989 | Japan ..................... | 395/117 |
| 1-171880 | 7/1989 | Japan ..................... | 395/115 |
| 3-91771 | 4/1991 | Japan ..................... | 395/115 |

*Primary Examiner*—Arthur G. Evans
*Attorney, Agent, or Firm*—Pollock, Vande Sande & Priddy

[57] ABSTRACT

Disclosed is a method and apparatus for printing a pattern which is obtained by making a second basic figure from the first basic figure; making output data based on the second basic figure, the output data representing an output figure which is obtained by joining a plurality of the second basic figures consecutively side by side in both the first and second directions so that the second basic figures are arranged in a plurality of parallel rows extending in the second direction, while shifting in the second direction the second basic figures located in each one of the rows from the second basic figures located in another row adjacent to the one row by a predetermined shifting distance including zero; and printing on a given web the output figure by using the output data; wherein the step of making the second basic figure comprises a first substep of dividing the first basic figure into first and second areas of equal sizes in the first direction; a second substep of dividing in the second direction each of the first and second areas into two small regions with a division ratio determined by a ratio of the shifting distance to a length of the first basic figure in the second direction such that the two small regions diagonally positioned have equal sizes; and a third substep of replacing the two small regions diagonally positioned by each other thereby to form the second basic figure.

34 Claims, 6 Drawing Sheets

FIG. 8
FIG. 9
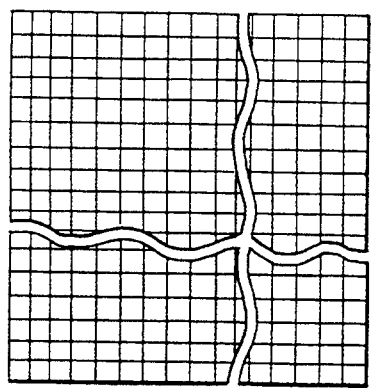
FIG. 10
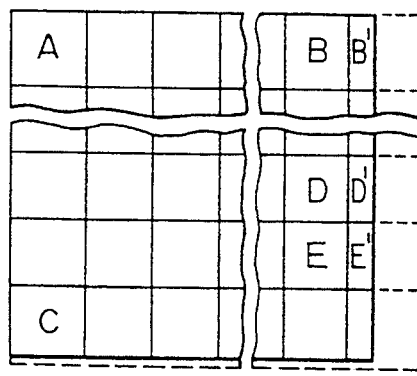
FIG. 11

METHOD AND APPARATUS FOR PRINTING CONTINUOUS PATTERN

This application is a continuation of U.S. Ser. No. 07/890,793, filed on Jun. 1, 1992.

BACKGROUND OF THE INVENTION

1. Field of the Invention

The present invention relates to a continuous pattern printing system, and more particularly to a system which can print a continuous pattern on a web such as paper and cloth by using image data representing a basic figure the continuous pattern being formed by joining a plurality of the basic figures consecutively side by side in both vertical and horizontal directions.

2. Description of the Related Art

In most cases, the pattern printed on a web such as wrapping paper, wallpaper and cloth is not designed as a single pattern to be printed on its entirety, but a basic figure, which is generally rectangular, is designed and a plurality of the basic figures are joined consecutively, side by side, in both vertical and horizontal directions so as to form a continuous pattern. A printing plate including the basic figures as joined is made, and printing is performed using this printing plate. The processing for joining two adjacent basic figures is performed by a method disclosed in, for example, JP-A-1-171880.

This method gradually reduces the mesh density in the neighborhood of the boundary between the adjacent basic figures and overlaps adjacent areas thereof so that the boundary between them is not clearly revealed.

This prior art method can join basic figures smoothly so that the boundary is not clearly revealed. However, it has the following defect. When printing a pattern of basic figures joined by shifting them little by little in a horizontal or vertical direction, a discontinuity may appear at the boundary. Namely, only shifting the basic figures to be joined does not provide a continuous pattern at the boundary.

SUMMARY OF THE INVENTION

An object of the present invention is to provide a method and an apparatus for printing on a web a continuous pattern which is obtained by joining basic figures, generally rectangular, side by side in both vertical and horizontal directions, while shifting the basic figures on two rows adjacent in the vertical or horizontal direction by a predetermined distance from each other in the row direction.

In the present invention, the basic figure used is generally a rectangle. But it should not be necessarily limited to a rectangle but may be a parallelogram. Further, the shifting distance may be a value including zero, which is smaller than the length of the basic figure in its shifting direction.

According to the present invention, a method of printing a continuous pattern comprises the steps of making a second basic figure from a first basic figure having a shape of tetragon having two sides parallel to a first direction and other two sides parallel to a second direction; making output data based on the second basic figure, the output data representing an output figure which is obtained by joining a plurality of the second basic figures consecutively side by side in both the first and second directions so that the second basic figures are arranged in a plurality of parallel rows extenting in the second direction, while shifting in the second direction the second basic figures located in each one of the rows from the second basic figures located in another row adjacent to the one row by a predetermined shifting distance including zero; and printing on a given web the output figure by using the output data; wherein the step of making the second basic figure comprises a first substep of dividing the first basic figure into first and second areas of equal sizes in the first direction, a second substep of dividing in the second direction each of the first and second areas into two small regions with a division ratio determined by the ratio of the shifting distance to a length of the first basic figure in the second direction such that the two small regions diagonally positioned have equal sizes; and a third substep of replacing the two small regions diagonally positioned by each other thereby to form the second basic figure.

For pursuing the above method, an apparatus of the present invention comprises: a memory device for storing, when printing, a continuous pattern which is obtained by joining a plurality of first basic figures, each having a shape of tetragon having two sides parallel to a first direction and other two sides parallel to a second direction, consecutively side by side in both the first and second directions so that the first basic figures are arranged in a plurality of parallel rows extending in the second direction, while shifting in the second direction the first basic figures located in each one of the rows from the first basic figures located in another row adjacent to the one row by a predetermined shifting distance including zero, shifting direction data representing the direction of shifting the first basic figures and shifting ratio data representing a ratio of the shifting distance to a length of the first basic figure in the second direction; means for making, based on first basic data representing the first basic figure, second basic data representing second basic figure; and means for making output data representing the continuous pattern based on the second basic data, the shifting direction data and the shifting ratio data stored in the memory device and means for printing the continuous pattern on a given web based on the output data.

BRIEF DESCRIPTION OF THE DRAWINGS

FIG. 8 is a view showing image data of the basic figure;

FIG. 9 is a view showing a threshold matrix;

FIG. 10 is a view showing the state where the basic figure is divided into blocks each having the size of the threshold matrix;

FIG. 11 is a view showing an output figure when plural basic figures are joined with the shifting amount of zero;

DESCRIPTION OF THE PREFERRED EMBODIMENTS

The present invention provides a method and apparatus for printing a continuous pattern which is obtained by joining basic figures consecutively in both X-direction and Y-direction. Each of the basic figures has a shape of tetragon having two sides parallel in the X-direction and other two sides parallel in the Y-direction. In order to maintain continuity of the pattern at the joint of two adjacent basic figures, the present invention makes a second basic figure on the basis of a first basic figure and acquires the data corresponding to an output figure. Now referring to FIGS. 1A and 1B, an explanation will be given of the relationship between the first basic figure and the second basic figure. Although it is assumed for convenience of explanation that the first basic figure is a rectangle, it can be easily understood by those skilled in the art that the first basic figure may be a parallelogram.

Figure 1A:
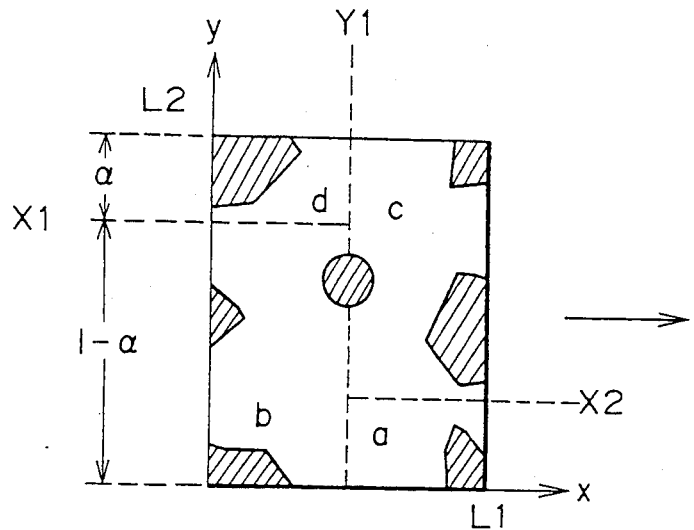
FIGS. 1A and 1B are views showing examples of first and second basic figures used in the present invention, respectively.
Figure 1B:
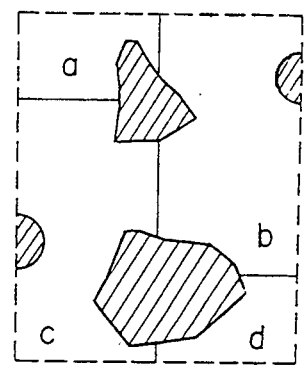

FIG. 1A shows a first basic figure A designed by a designer. Now it is assumed that a continuous pattern is obtained by joining the basic figures A's side by side in a vertical (Y-) direction and a horizontal (X-) direction so that the basic figures are arranged in a plurality of rows parallel in the Y-direction and shifting the basic figures in each row by a predetermined shifting distance in the Y-direction from the basic figures in an adjacent row. In this case, the basic figure A is divided into two areas of equal sizes in the X-direction. Each of the divided areas is divided into two regions with a ratio of $\alpha$: $(1-\alpha)$ in the Y-direction. The value of $\alpha$ is $\frac{1}{2}$ of a shifting ratio which is the ratio of a shifting distance to the length of the basic figure A in the shifting direction (now Y-direction). For example, when the basic figure A is shifted by the distance which is equal to $\frac{1}{2}$ of its vertical length, $\alpha = \frac{1}{4}$. Thus, the basic figure A is divided into four regions a, b, c and d as shown in FIG. 1A. The regions a and c have the same sizes as those of the regions d and b, respectively, and the formers and the latters are diagonally positioned, respectively. By exchanging the positions of the regions a and c with the regions d and b, respectively, the second basic figure B as shown in FIG. 1B can be obtained. If discontinuity appears in the joints at the center of the second basic figure B, the basic figure B is corrected to eliminate the discontinuity. Particularly, FIGS. 1A and 1B show the figures where $\alpha = \frac{1}{2}$. In the above explanation, the horizontal and vertical directions were set as X- and Y-directions, respectively, but they may be set as the Y- and X-directions, respectively. In this case, the shifting direction is the horizontal direction.

Figure 2:
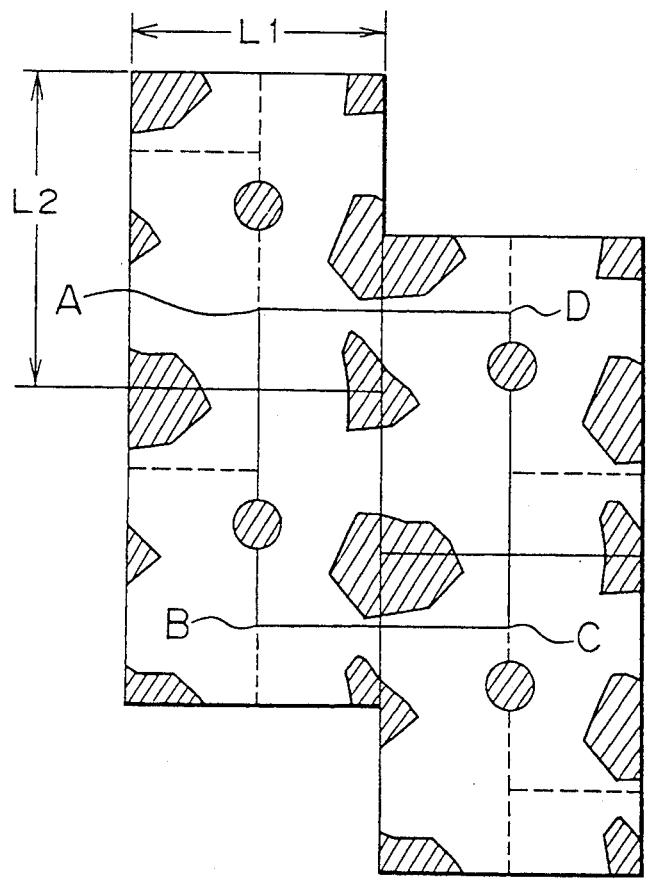
FIG. 2 is a view showing the relationship between the output figure obtained by using the first basic figure of FIG. 1A and the second basic figure of FIG. 1B.

When a plurality of the first basic figures A's are arranged side by side in both X- and Y-directions so that the first basic figures are arranged in a plurality of rows parallel to the Y-direction, and the basic figures in each row are shifted in the Y-direction by a predetermined distance d from the basic figures in an adjacent row, the output figure corresponding to a continuous pattern to be printed is obtained. FIG. 2 shows four basic figures A's thus obtained which constitute a part of the continuous pattern. In FIG. 2, when cutting out an area ABCD with an upper left apex and having the same size (horizontal length: L1, vertical length: L2) as the basic figure A, the area ABCD is the same as the second basic figure shown in FIG. 1B. From this, it will be understood that the continuous pattern of FIG. 2 is the same as the continuous pattern which is obtained by joining the second basic figures B's consecutively, side by side, in both X- and Y-directions so that the second basic figures are arranged in rows parallel to the Y-direction, while shifting in the Y-direction the second basic figures on each row by a predetermined shifting distance d from the second basic figures on an adjacent row. As seen from FIG. 2, continuity of the pattern is maintained at the boundary between adjacent first basic figures A's.

Figure 3:
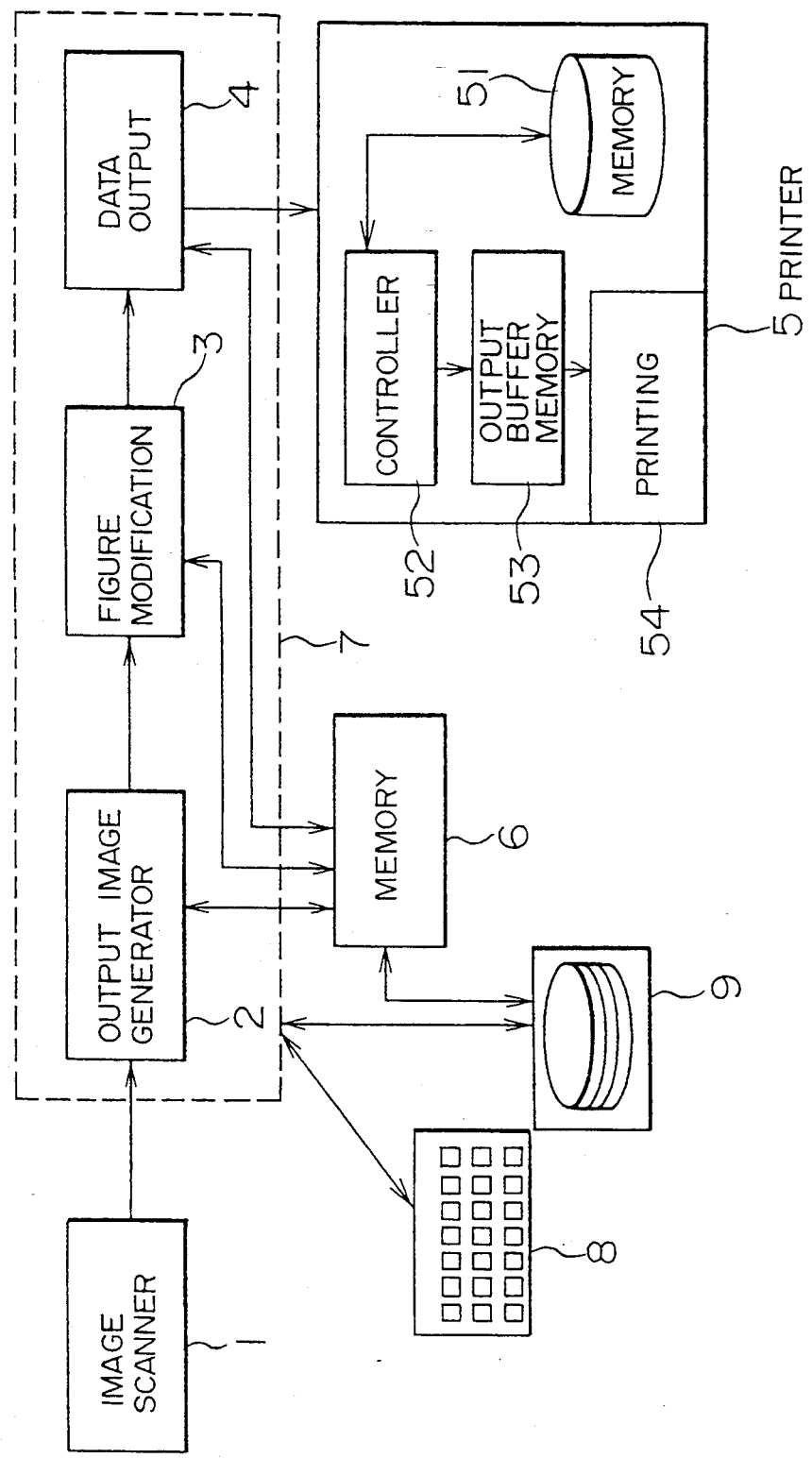
FIG. 3 is a block diagram showing an arrangement of the continuous pattern printing apparatus according to one embodiment of the present invention.

FIG. 3 is a block diagram showing an arrangement of the continuous pattern printing apparatus according to one embodiment of the present invention. Numeral 1 denotes an image scanner which reads the basic figure as shown in FIG. 1A to obtain the basic figure data representative of its pattern. An image generating device used in computer graphics may be used. Numeral 2 denotes an output image generating device which generates basic figure data representative of the basic figure B as shown in FIG. 1B on the basis of the basic figure data read by the image scanner 1. Numeral 3 denotes a device for trimming the basic figure data to modify the basic figure B. Numeral 4 denotes a data output device for performing gradation processing of adjusting the gradation of printing density. 5 denotes a printer. The devices 2, 3 and 4 may be provided as individual devices; however their functions may be implemented by software in a workstation 7. The work station 7 is connected with a memory device 6 as common storage. The printer 5 may be either a laser beam printer or an electrostatic recording plotter. But the electrostatic recording plotter, which uses printing dyes as toner, is more suitable for printing for long cloth. Its details will be described later. The work station 7 is connected with an input device 8 and an optical disk device 9. The data for a shifting ratio and a shifting direction are inputted from the input device 8. The generated data for an output figure are registered on the optical disk device 9 to provide a library of textile patterns.

An explanation will be given of generation of the basic figure data representative of the basic figure B by the output image generation device 2.

Now it is assumed that the basic figure A shown in FIG. 1A is shifted in a vertical (Y-) direction by $\frac{1}{2}$ of its vertical length L2 (shifting ratio: $\frac{1}{2}$). First, the basic figure A is divided into two equal areas along line Y1 in the horizontal direction so as to form right and left areas having equal sizes. Each of the areas is divided into two regions with the ratio of $\alpha:(1-\alpha)$ along line X1 or X2 so that two regions having equal sizes are diagonally positioned. In this case, since the shifting ratio is $\frac{1}{2}$, $\alpha = \frac{1}{4}$. So the above two areas are each divided at the ratio of 1:3 in the vertical direction to form four regions a, b, c and d as shown in FIG. 1A. The regions a and d are diagonally positioned and have equal sizes. Likewise, the regions c and b are diagonally positioned and have equal sizes. When the regions a and d (and the regions c and b) positioned diagonally are replaced in position by each other, the basic figure B as shown in FIG. 1B is obtained.

The basic figure B data generated by the output image generating device 2 are corrected or modified for image adjustment by the figure modification device 3, and the modified data are transferred to the data output device 4. The data output device 4 applies to the basic figure B data gradation processing suitable to the printer 8 selected from known gradation processing methods including the dither method and the error diffusion method. The device 4 sends the resultant data to the printer 5 together with the data representative of the shifting direction and ratio. The gradation processing method to be used is specified by the input device 8.

The printer 5 stores on an internal memory device 51 the data of the shifting direction and ratio received from the data output device 5 and the basic figure data of the basic figure B. A writing controller 52 within the printer reads the basic figure data from the memory device 51 to provide printing data corresponding to a continuous printing pattern on the basis of the shifting direction and ratio, and supplies the printing data to an output buffer memory device 53. A printing unit 54 prints the continuous pattern on a given web on the basis of the printing data supplied from the output buffer memory device 53. Where the printer 5 is an electrostatic recording device, the printing unit 54 prints the continuous pattern with the aid of an electrostatic recording head, on the web shifted at a predetermined speed, one line by one line in the direction perpendicular to the web shifting direction. The writing controller 52 supplies, to the output buffer memory device 53, the part selected from the above basic figure data on the basis of the shifting direction and ratio so that the printing data for, for example, ten lines in the above printing are generated and stored at a time in the output buffer memory device 53.

Now referring to FIGS. 4 and 5, an explanation will be given of generation of the printing data.

Figure 4:
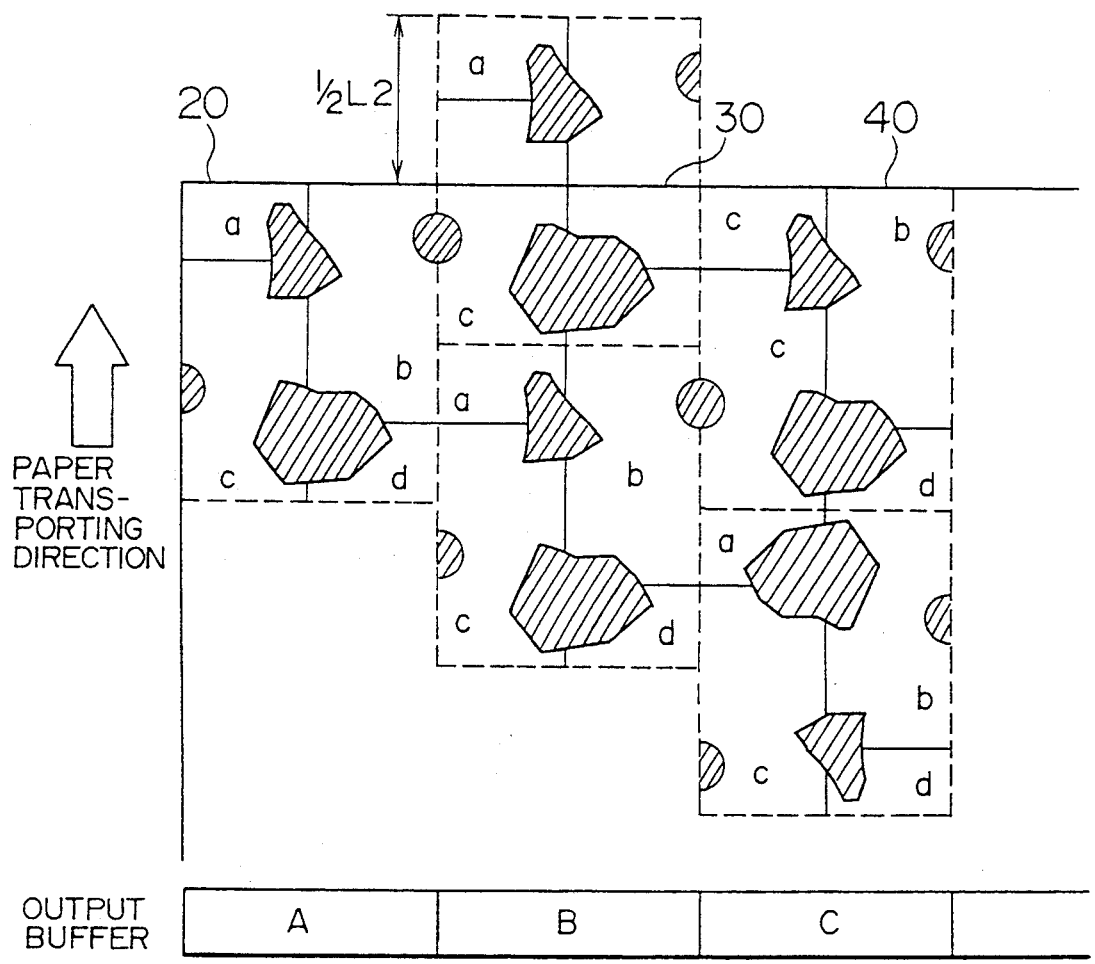
FIGS. 4 and 5 are views for explaining the method of obtaining output figure data on the basis of the data representative of the second basic figure.
Figure 5:
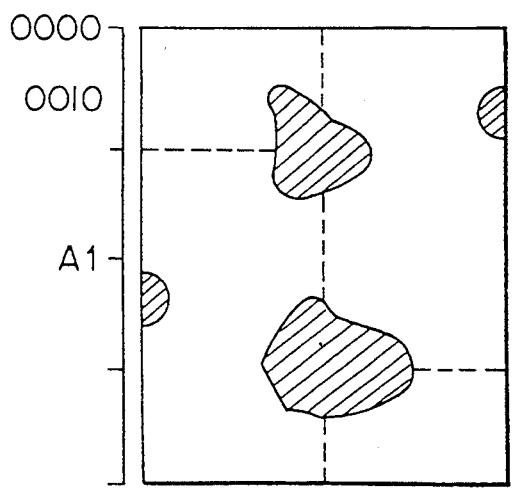

FIG. 4 shows part of a continuous pattern obtained by joining the basic figures B's of FIG. 1B consecutively in both X- and Y-directions so that the basic figures are arranged in a plurality of rows parallel to the Y-direction, while shifting in the Y-direction the basic figures B on each row by a distance of ½ of the Y-direction length of the basic figures B from the basic figures on the adjacent row. This continuous pattern as shown corresponds to part of three rows parallel to the Y-direction appearing at the left-side end portion when it is printed on cloth. Now it is assumed that printing data for 10 lines in printing the continuous pattern are generated at a time. As shown in FIG. 5, the basic figure data for the basic figure B are stored on the memory device 51, and the data stored on each of the addresses 0001, 0002, ... of the memory device 51 corresponds to one line of the basic figure B to be printed. First, the data of ten lines of the basic figure B to be printed on area 20 in FIG. 4, that is, the data stored in the addresses 0000 to 0009 are read from the memory device 51 and stored on region A of the output buffer memory 53. Next, the data of ten lines of the basic figure B to be printed on area 30 of FIG. 4 are read from the memory device 51. Since the basic figure B on the area 30 is shifted from that on the area 20 by ½ of L2, the data stored at addresses from A1 where the data of the center part in the vertical direction of the basic figure B in FIG. 5 are stored to (A1+9) are read out and stored on an area B adjacent to the area A of the output buffer memory 53. Since the basic figure B printed on area 40 is in phase with that on the area 20, the data of ten lines of the basic figure B in FIG. 5, i.e., the data in the addresses 0000 to 0009 are read out of the memory device 51 and stored in an area C of the output buffer memory 53. Thus, the data of ten lines of the continuous pattern as shown in FIG. 4 are stored on the output buffer memory 53.

The most suitable of the printers is an electrostatic recording device in a single-path system which performs multi-color printing of four primary colors i.e. black, cyan, mazenta and yellow through a single path. When a color pattern is to be printed continuously on a long web, an electrostatic recording device in a multi-path system, which prints four primary colors through four separate paths, necessitates registration among different colors so that the length of the web is limited. Further since the direct printing involves problems, when applied to a cloth, in durability and color reproducibility, it is most suitable to combine the electrostatic recording device of a single path system with a dye-transfer printing device as disclosed in JP-A-3-91771. However, where a color pattern is to be printed on a cut sheet of paper, a color laser beam printer or a thermal printer may be used.

As a specific case of the above embodiment, an explanation will be given of the processing for a "normal-shifted pattern" in which plural original basic figures A's are only joined in both X- and Y-directions consecutively and side by side with a shifting distance of zero and hence a shifting ratio of zero. In this case also, if output data are generated directly from the basic figure data representative of the basic figure A, continuity of the pattern cannot be maintained at the boundary between adjacent basic figures A's. So, as in the above embodiment, when making a continuous pattern of the original basic figures A's as shown in FIG. 6A joined side by side, the printing basic figure as shown in FIG. 6B is formed.

Figure 6A:
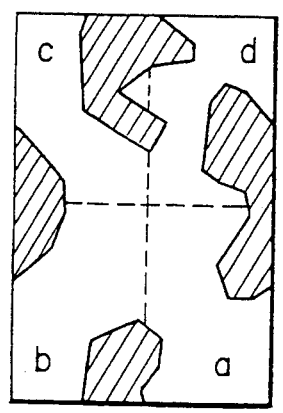
FIGS. 6A and 6B are views showing other examples of the first and second basic figures used in the present invention, respectively.
Figure 6B:
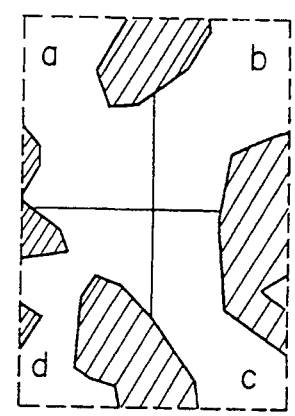
Figure 7:
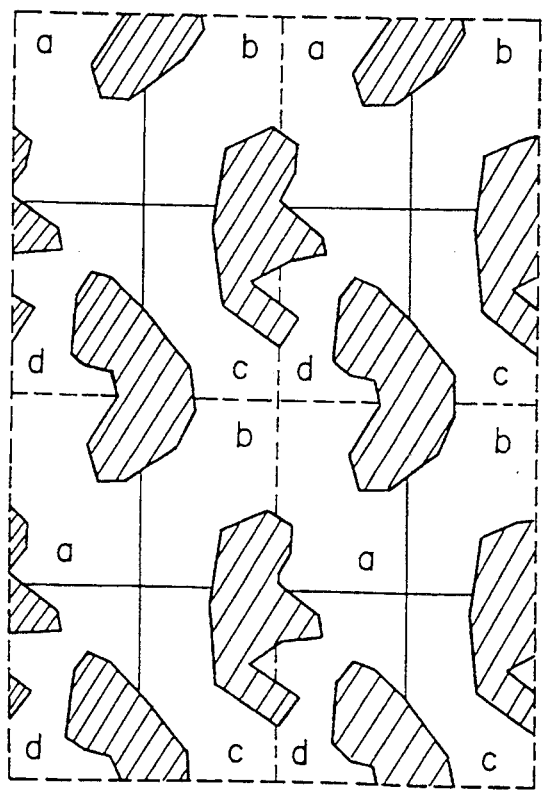
FIG. 7 is a view showing the relationship between the output figure obtained by using the first basic figure of FIG. 6A and the second basic figure of FIG. 6B.

Specifically, the original basic figure A shown in FIG. 6A is divided into four areas; the areas diagonally positioned are replaced by each other to make the printing basic figure B shown in FIG. 6B. By printing the printing basic figures B's consecutively, the normal-shifted pattern as shown in FIG. 7 can be printed.

Now referring to FIGS. 8 to 13, an explanation will be given of an embodiment in which the present invention is applied to a printer with gradation representation. There are many techniques for representing gradations. One of area gradation techniques which represent the gradation as a set of binary dots is this method. In the Dither method, the original image is represented by a set of square blocks each having $M \times N$ dots. The average density of each square block is compared with threshold values of the $M \times N$ dots, which are given by a Dither threshold matrix and only the dots of the square block, whose threshold values given by the Dither threshold matrix exceed the average density, are colored thereby reproducing an image having gradations as a whole. Now it is assumed that the original image represented by a set of dots each having a density gradient of 0 to $2''$ as shown in FIG. 8 is binary-digitized by using the $4 \times 4$ threshold matrix as shown in FIG. 9. With respect to the original image of FIG. 8, the average density of each square block of $(4 \times 4)$ dots is compared with the threshold values of $4 \times 4$ dots given by the threshold matrix. For example, if the average density is 6, the dots having threshold values of 1 to 6 in FIG. 9 are binary-digitized to logic 1 whereas the remaining dots are binary-digitized to logic 0. Incidentally, dots on the threshold matrix shown in FIG. 9 are numbered from 1 to 16 for simplicity of the explanation. However, these numbers are only numerals indicative of the order of taking logic 1 so that the density gradient is not necessarily required to be divided equally from 1 to 16. The "random Dither method" generates the threshold matrix at random.

In this way, the Dither method deals with the original image as a set of square blocks each having (M×N) dots. Where the vertical and horizontal sizes of the original image are not integer-times as large as the square block of (M×N) dots as shown in FIG. 10, if the original image or basic figure of FIG. 10 is shifted, the continuity of the image will be lost and unnatural joints will be produced. Specifically, if the size of the original image is 402×397 dots, portions which are not included in a set of the (4×4) dot matrices appear at two lines at the right end and one line at the lower end.

Figure 12:
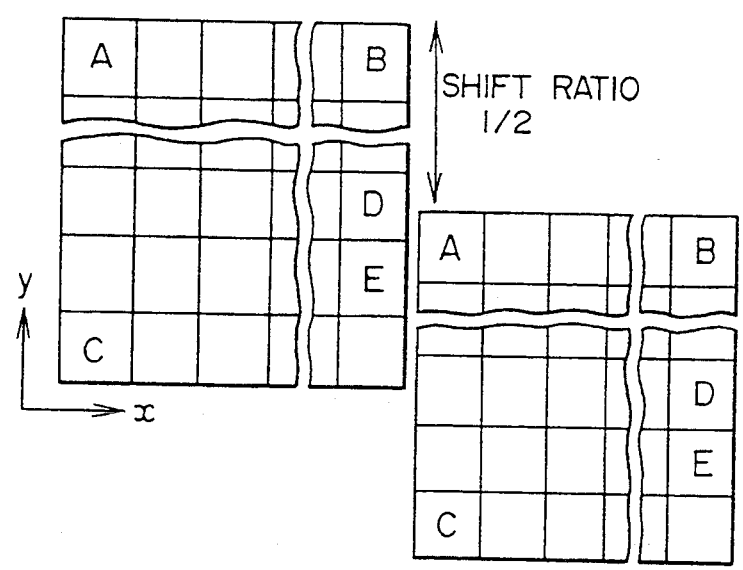
FIG. 12 is a view showing an output figure when basic figures are joined with the shifting amount of $\frac{1}{2}$ L.

FIG. 12 shows the case when the basic figure is shifted in the Y-direction with a shifting ratio of $\frac{1}{2}$. In this case, the discontinuity in the matrices occurs at the boundary between adjacent two basic figures in the Y-direction.

In order to obviate such an inconvenience, the present invention enlarges or reduces the original image so that the dot size of the image is integer-times as large as that of the threshold matrix. The image thus enlarged or reduced is taken as a basic figure and binary-digitized by using the threshold matrix. In this embodiment, the original image shown in FIG. 8 is reduced to have a size of (400×396) dots. Whether the image should be enlarged or reduced depends on the number of dots to be increased or decreased; so as to select enlargement or reduction, which provides a smaller number of dots to be changed.

Thus, the resultant basic figure has a dot size which is integer-times as large as that of the threshold matrix, but it cannot necessarily satisfy all shift patterns. In the case of FIG. 12, if the image of 400×396 dots is processed by using the threshold matrix of (4×4) dots, the number of the matrices included in the basic figure is 100×99. So if the shift ratio is different from the value which is integer-times as large as the reciprocal of a divisor of 99, i.e., the number of the threshold matrices in the vertical direction, the discontinuity of matrices between adjacent images will occur. When a picture exists at an edge of one side of the figure, the shifting ratio in a direction of the one side is restricted by the location of the picture. On the other hand, when no picture exist at the edge, the shifting ratio is free. In this embodiment, in order to deal with the shifting ratios of $\frac{1}{2}$, $\frac{1}{3}$, $\frac{1}{4}$, etc, the basic figure is enlarged or reduced so that the number of the threshold matrices included in the basic figure is a multiple of the least common multiple (=12) of a denominator of the shifting ratio. For example, in this embodiment, the number of threshold matrices of 99×100 is reduced to 96×96 so that the basic figure has a size of (384×384) dots.

Generally, in order to conceal any joint where the size of the threshold matrix is (M×N) dots and the shifting ratio is $1/S_1, 1/S_2, \ldots 1/S_n$, the size of a basic figure may be enlarged or reduced so that vertical: (the least common multiple of $1/S_1, 1/S_2, \ldots 1/S_n$)×a multiple of M, and horizontal: (the least common multiple of $1/S_1, 1/S_2, \ldots 1/S_n$)×a multiple of N.

In this embodiment, since $S_1=2$, $S_2=3$, $S_4=4$, $M=4$ and $N=4$, the vertical and horizontal sizes are set to a multiple of 12×4=48, no joint appears.

Actually, since it is impossible to deal with all magnification factors, the size of the basic figure is set to satisfy several kinds of magnification factors including, for example, 1, 2, 3 and 4. In this case, it is set to a multiple of the above least common multiple of 12.

Figure 13:
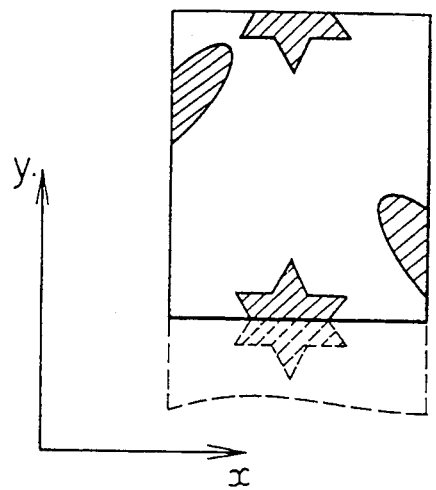
FIGS. 13 and 14 are diagrams for explaining the method of printing a continuous pattern based on a specific basic figure.

In a case where a pattern of a star is divided into two parts at edges of the upper and lower sides of the basic figure and a pattern of a heart is divided into two parts at edges of right and left sides of the basic figure, as shown in FIG. 13, and that when the basic figure is jointed with another identical basic figure in the y-direction as shown by a dotted line in FIG. 13, the two parts of the star are connected correctly to form a complete star, while it is required to shift the basic figures in the y-direction with a shifting ratio of $\frac{1}{2}$ in order to obtain a complete pattern of the heart by jointing the basic figures in the x-direction, it is enough to deal with the shifting of the basic figures in the y-direction with the shifting ratio of $\frac{1}{2}$.

Figure 14:
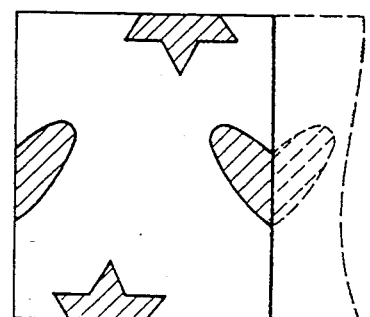

On the other hand, in a case where a pattern of a star is divided into two parts at edges of the upper and lower sides of the basic figure and a pattern of a heart is divided into two parts at edges of right and left sides of the basic figure, as shown in FIG. 14, and when the basic figure is jointed with another identical basic figure in the x-direction as shown by a dotted line in FIG. 13, the two parts of the heart are connected correctly to form a complete heart, while it is required to shift the basic figures in the x-direction with a shifting ratio of $\frac{1}{2}$ in order to obtain a complete pattern of the star by jointing the basic figures in the y-direction, it is enough to deal with the shifting of the basic figures in the x-direction with the shifting ratio of $\frac{1}{2}$.

Thus, this embodiment can provide a printing system in which the joint is not generated when the basic figure is shifted with plural shifting ratios.

We claim:

1. A method for printing a continuous pattern which is obtained by repeating a basic pattern, said method comprising the steps of:

forming a second basic figure from a first basic figure representing the basic pattern and having a shape of tetragon with two sides parallel to a first direction and other two sides parallel to a second direction;

obtaining output data representing an output figure which is obtained by joining a plurality of the second basic figures consecutively side by side in both the first and second direction so that the second basic figures are arranged in a plurality of parallel rows extending in the second direction, while shifting in the second direction the second basic figures located in each one of the rows from the second basic figures located in another row adjacent to the one row by a predetermined shifting distance including zero; and printing on a given web the output figure by using the output data;

wherein the step of making the second basic figure includes:

a) dividing the first basic figure into first and second areas of equal sizes in the first direction;

b) dividing each of the first and second areas into two small regions in the second direction with a division ratio determined by a ratio of the shifting distance to a length of the first basic figure in the second direction such that the two small regions diagonally positioned have equal sizes; and c) replacing the two small regions diagonally positioned by each other to form the second basic figure.

2. A method of printing a continuous pattern according to claim 1, wherein said first basic figure has a shape of a rectangle.

3. A method of printing a continuous pattern according to claim 1, wherein said division ratio is $\alpha:1-\alpha$, when said shifting ratio is represented by $2\alpha$.

4. A method of printing a continuous pattern according to claim 1, wherein when said shifting distance is zero, said division ratio is 1:1.

5. A method of printing a continuous pattern according to claim 1, further comprising the steps of dividing said second basic figure into a plurality of blocks each having a matrix of M pixels in the first direction and N pixels in the second direction (M, N: a positive integer), and comparing each block with a Dither matrix of $M \times N$ to represent the block with the density gradation based on the Dither method.

6. A method of printing a continuous pattern according to claim 5, wherein said step of representing the block with the density gradation comprises, when the length of each of said second basic figures measured in terms of the number of pixels in each of the first and second directions is not integer-times as large as the number M or N of pixels in the corresponding direction of said block, the step of canceling a surplus portion or adding a deficient portion to reduce or enlarge the size of the second basic figure so that the lengths of said second basic figure in the first and second directions are integer-times as large as M and N.

7. A method of printing a continuous pattern according to claim 6, wherein said shifting ratio is selected so that said shifting distance represented in terms of the number of pixels is integer-times as large as the length of said block in said second direction.

8. A method of printing a continuous pattern according to claim 7, wherein the step of reducing or enlarging the size of said second basic figure selects any of reduction or enlargement which provides a smaller one of a changing rate of said second basic figure when reduced and that when enlarged.

9. An apparatus for printing a continuous pattern which is obtained by joining a plurality of first basic figures representing identical patterns, respectively, each of said first basic figures having a shape of tetragon with two sides parallel to a first direction and other two sides parallel to a second direction, consecutively side by side in both the first and second directions so that the first basic figures are arranged in a plurality of parallel rows extending in the second direction, while shifting in the second direction the first basic figures located in each one of the rows from the first basic figures located in another row adjacent to the one row by a predetermined shifting distance including zero, said apparatus comprising:

a memory device for storing shifting direction data representing the direction of shifting of the first basic figures and shifting ratio data representing a ratio of the shifting distance to a length of the first basic figure in the second direction;

means for forming, based on first basic data representing the first basic figure, second basic data representing a second basic figure, wherein the second basic figure is obtained by dividing the first basic figure into first and second areas of equal sizes in the first direction, dividing in the second direction each of the first and second areas into two small regions with a division ratio determined by the ratio of the shifting distance to a length of the first basic figure in the second direction such that the two small regions diagonally positioned have equal sizes, and replacing the two small regions diagonally positioned by each other;

means for obtaining output data representing the continuous pattern based on the second basic data, the shifting direction data and the shifting ratio data stored in the memory device; and means for printing the continuous pattern on a given web based on the output data.

10. An apparatus for printing a continuous pattern according to claim 9, wherein said first basic figure has a shape of a rectangle.

11. An apparatus for printing a continuous pattern according to claim 9, wherein said division ratio is $\alpha:1-\alpha$, when said shifting ratio is represented by $2\alpha$.

12. An apparatus for printing a continuous pattern according to claim 9, wherein when said shifting distance is zero, said division ratio is 1:1.

13. An apparatus for printing a continuous pattern according to claim 9, further comprising means for dividing said second basic figure into a plurality of blocks each having a matrix array composed of M pixels in the first direction and N pixels in the second direction (M, N: a positive integer), and means for comparing each block with a Dither matrix of $M \times N$ to represent it by a density gradation based on the Dither method.

14. An apparatus for printing a continuous pattern according to claim 13, wherein said means for representing the block with the density gradation comprises means for canceling, when the length of said second basic figure measured in terms of the number of pixels in each of the first and second directions is not integer-times as large as the number M or N of pixels in the corresponding direction of said block, a surplus portion or adding a deficient portion to reduce or enlarge the size of the second basic figure so that the lengths of said second basic figure in the first and second directions are integer-times as large as M and N.

15. An apparatus for printing a continuous pattern according to claim 14, wherein said shifting ratio is selected so that said shifting distance represented by the number of pixels is integer-times as large as the length of said block in said second direction.

16. An apparatus for printing a continuous pattern according to claim 15, wherein the means for reducing or enlarging the size of said second basic figure includes means for comparing a changing rate of said second basic figure when reduced with that when enlarged and means for selecting reduction or enlargement which provides a smaller changing rate.

17. A method of printing a continuous pattern which is obtained by repeating a basic pattern, said method comprising the steps of:

forming a basic figure of a tetragonal shape having its first sides parallel to a first direction and second sides parallel to a second direction and representing the basic pattern;

obtaining output data based on the basic figure, the output data representing at least a part of the continuous pattern which is obtained by joining a plurality of the basic figures consecutively side by side in both the first and second directions so that the basic figures are arranged in a plurality of rows extending parallelly in the first direction and the basic figures arranged in each one of the rows are shifted in the first direction by a selected distance including zero from the basic figures arranged in a next row adjacent in the second direction to said one row; and printing on a web the continuous pattern by using the output data.

18. A method according to claim 17, further comprising the step of applying tone gradation processing to the basic figure.

19. A method according to claim 18, wherein said tone gradation processing is carried out by a dither method such that the basic figure is divided into a plurality of blocks, each having a matrix of m×n pixels where m and n are positive integers, and each block is compared with a m×n dither matrix thereby determining tones of the pixels included in the block.

20. A method according to claim 19, further comprising the steps of correcting the basic figure, when any one of the first and second sides of the basic figure is unequal in length represented by a number of pixels to an integer-multiple of a corresponding side of the block, by cutting or extending the length of the unequal side of the basic figure to the length of the corresponding side of the block.

21. A method of printing a continuous pattern which is substantially obtained by repeating a basic pattern, said method comprising the steps of:

making a basic figure of a tetragonal shape having two sides parallel to a first direction and other two sides parallel to a second direction and representing the basic pattern;

obtaining output data based on the basic figure, the output data representing at least a part of the continuous pattern which is formed by joining a plurality of the basic figures consecutively side by side in both the first and second directions so that the basic figures are arranged in a plurality of rows parallelly extending in the first direction and the basic figures arranged in each one of the rows are shifted in the first direction by a selected distance including zero from the basic figures arranged in a next row adjacent in the second direction to said one row, while applying a correction to the basic figure so as to maintain continuity to the pattern at a boundary between any adjacent two of the basic figures; and printing on a web the continuous pattern by using the output data.

22. A method according to claim 21, wherein said output data is made by using a second basic figure in place of said first basic figure, said second basic figure being a modification of said first basic figure and by applying the correction to the second basic figures.

23. A method according to claim 21, further comprising the step of applying tone gradation processing to the basic figure.

24. A method according to claim 23, where said tone gradation processing is carried out by a dither method such that the figure is divided into a plurality of blocks, each having a matrix of m×n pixels, where m and n are positive integers, and each block is compared with a m×n matrix thereby determining tones of the pixels included in the block.

25. A method according to claim 24, further comprising the steps of correcting the basic figure, when any one of the first and second sides of said basic figure is unequal in length represented by a number of pixels to an integer-multiple of a corresponding side of the block, by adjusting the length of said unequal side of the basic figure to the length of the corresponding side of the block.

26. An apparatus for printing a continuous pattern which is obtained by joining a plurality of basic figures representing identical patterns, each of said basic figures having a tetragonal shape with first sides parallel to a first direction and second sides parallel to a second direction, consecutively side by side in both the first and second directions so that the first basic figures are arranged in a plurality of rows extending parallelly in the first direction and the basic figures arranged in each one of the rows are shifted in the first direction by a selected distance including zero from the basic figures arranged in a next row adjacent in the second direction to said one row, said apparatus comprising:

a memory for storing shifting direction data representing the direction of shifting the basic figures and shifting ratio data representing a ratio of the shifting distance to a length of the basic figure in the first direction;

means for generating output data representing at least a part of the continuous pattern based on said shifting direction data and said shifting distance data stored in said memory, and basic data representing said basic figure; and means for printing on a web the continuous pattern by using the output data.

27. An apparatus according to claim 26, further comprising means for applying tone gradation processing to the basic figure.

28. An apparatus according to claim 27, wherein said means for applying tone gradation processing includes means for dividing the basic figure into a plurality of blocks, each having a matrix of m×n pixels, where m and n are positive integers, and means for comparing each block with said m×n matrix thereby determining tones of the pixels included in the block.

29. An apparatus according to claim 28, wherein said means for applying tone gradation processing further includes means for correcting the basic figure, when any one of the first and second sides of said basic figure is unequal in length represented by a number of pixels to an integer-multiple of a corresponding side of the block, by adjusting the length of said unequal side of the basic figure to the length of the corresponding side of the block.

30. An apparatus for printing a continuous pattern which is obtained by joining a plurality of basic figures representing identical patterns, respectively, each of said basic figures having a tetragonal shape with first sides parallel to a first direction and second sides parallel to a second direction, consecutively side by side in both the first and second directions so that the basic figures are arranged in a plurality of rows parallelly extending in the first direction, and the basic figures arranged in each one of the rows are shifted in the first direction by a selected distance including zero from the basic figures arranged in a next row adjacent in the second direction to said one row, said apparatus comprising:

a memory for storing shifting direction data representing the direction of shifting the basic figures and shifting ratio data representing a ratio of the shifting distance to a length of the basic figure in the first direction;

means for generating output data representing at least a part of the continuous pattern based on said shifting direction data and said shifting distance data stored in said memory, and basic data representing said basic figure, while applying a correction to the basic figure so as to maintain continuity of the pattern at a boundary between any adjacent two of the basic figures; and means for printing on a web the continuous pattern by using the output data.

31. An apparatus according to claim 30, further comprising means for making a second basic figure which is a modification of said first basic figure and wherein said output data is generated in said means for generating said output data, by using said second basic figure in place of said first basic figure and applying said correction to said second basic figure in place of said first basic figure.

32. An apparatus according to claim 30, further comprising means for applying tone gradation processing to the basic figure.

33. An apparatus according to claim 32, wherein said means for applying tone gradation processing includes means for dividing the basic figure into a plurality of blocks, each having a matrix of $m \times n$ pixels, where m and n are positive integers, means for comparing each block with a $m \times n$ dither matrix thereby determining tones of the pixels included in the block.

34. An apparatus according to claim 33, wherein said means for applying tone gradation processing further includes means for correcting the basic figure, when any one of the first and second sides of said basic figure is unequal in length represented by a number of pixels to an integer-multiple of a corresponding side of the block by adjusting the length of said unequal side of the basic figure to the length of the corresponding side of the block.

* * * * *